Dec. 5, 1967 A. C. TICKLE 3,357,000

THIN FILM INFORMATION TRANSFER DEVICES

Filed March 25, 1964

INVENTOR
ANDREW CHARLES TICKLE
BY Hane and Nydick
ATTORNEYS 3,357,000

THIN FILM INFORMATION TRANSFER DEVICES

Andrew Charles Tickle, Stevenage, England, assignor to International Computers and Tabulators Limited Filed Mar. 25, 1964, Ser. No. 354,533
Claims priority, application Great Britain, Apr. 5, 1963, 13,626/63
6 Claims. (Cl. 340—174)

Figures 1, 2, 3, 4:
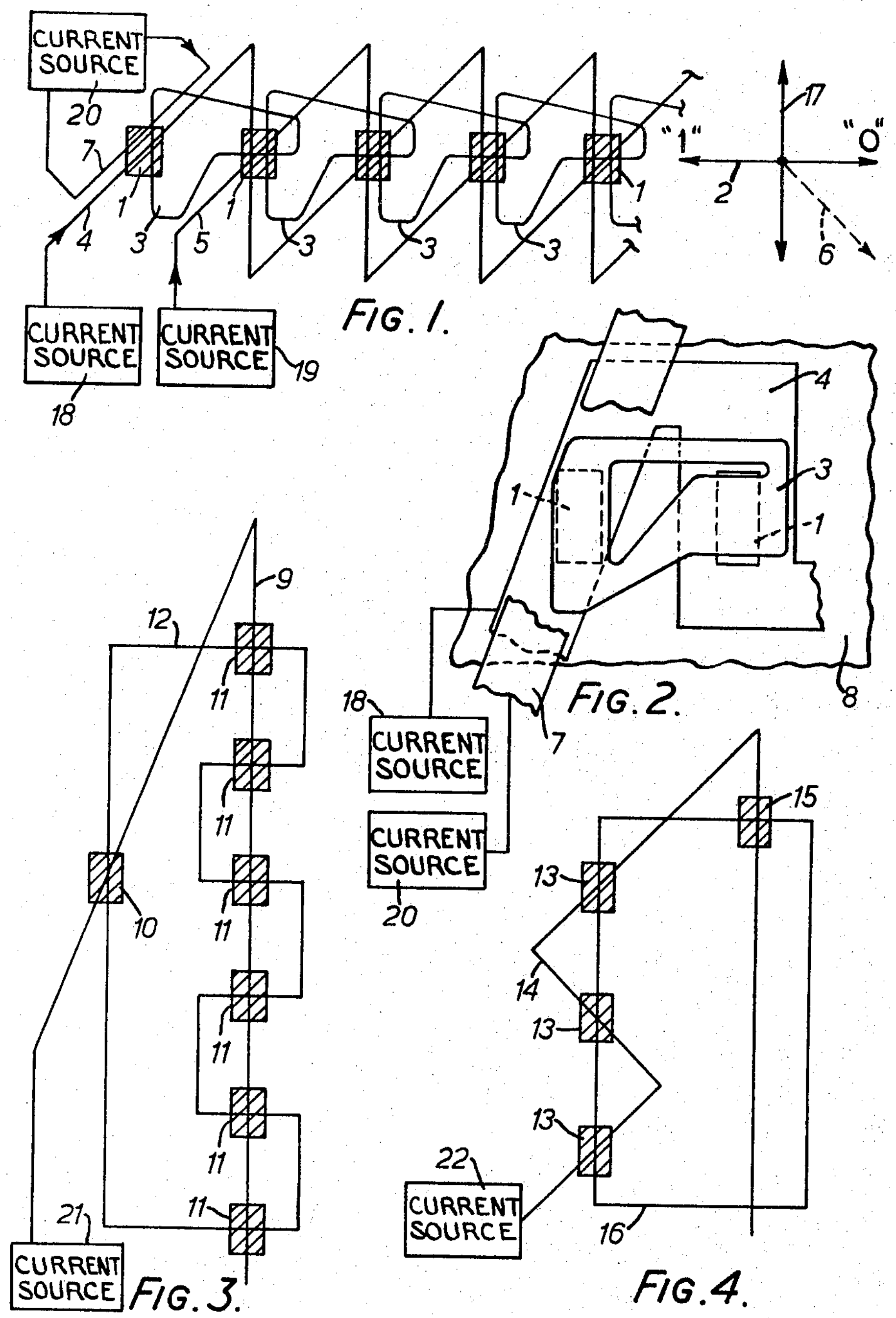

The present invention relates to apparatus employing anisotropic magnetic thin films for the storage and transfer of information items.

It is an object of the invention to provide apparatus employing anisotropic magnetic thin film areas in which an item of information stored in one area of films is transferred to another film area by the rotational switching of the second film area to an information representing remanent magnetic state.

According to the present invention, information storage and transfer apparatus includes a pair of first and second information storage bistable elements each comprising an area of anisotropic magnetic thin film with mutually perpendicular easy and hard axes of magnetisation, each area being switchable by domain rotation between a set state in which the magnetisation is aligned in one direction along the easy axis and an unset state in which the magnetisation is aligned in the opposite direction along the easy axis, said set state representing a stored information item of predetermined binary significance, first magnetic field generating means to apply simultaneously a temporary unsetting magnetic field to said first element and a temporary setting magnetic field, aligned substantially in said one direction along the easy axis, to said second element, and linking means linking said first and second elements and effective, when said first element is switched from the set state to the unset state, to apply to said second element a magnetic field which is substantially aligned with the hard axis and which is effective in combination with said temporary setting field to switch said second element to the set state, whereby an information item of said predetermined binary significance is transferred from said first element to said second element.

Embodiments of the present invention will now be described, by way of example, with reference to the accompanying drawing, in which FIGURE 1 is a schematic representation of an information item shifting register, FIGURE 2 is a detailed view of part of the register of FIGURE 1, FIGURE 3 is a schematic representation of an information item transfer arrangement, and FIGURE 4 is a schematic representation of a logical gating arrangement for the transfer of an item.

Elementary areas of thin anisotropic magnetic film may be provided by the evaporation in vacuo of an ingot of material to form a film layer on a supporting substrate. Such elementary areas may be individual small areas of film produced, for example, by suitably masking the substrate during deposition or by etching away unwanted portions of a continuous film after the completion of deposition. During the formation of the film layer an orienting magnetic field is applied and the resultant film then has a preferred direction of magnetisation, the so-called "easy" axis, with which the magnetisation vector is aligned in the absence of any external field. The film areas have two stable states of magnetisation corresponding to the alignment of the vector with the easy axis in one or the other direction.

Elementary areas of film may conveniently be used for the storage of binary information, the alignment of the vector in one direction along the easy axis representing a binary "one" and in the opposite direction a binary "zero." An area may be switched from one state to the other by, for example, producing a magnetic field parallel to the easy axis linking with the film and of sufficient magnitude to saturate the film in the opposite sense. This form of switching takes place by wall motion. That is, areas of reversed magnetic state are formed in the film and the boundary walls of these areas move so that the areas grow in size until the entire film has been switched to the reversed stable state.

An alternative method of switching utilises the so-called rotational switching mode of the film. In this case the applied driving field has components both parallel to and perpendicular to the easy axis. Under these conditions, the magnetisation vector is rotated from its initial direction through more than 90°, i.e., past the hard axis, and is allowed to relax, after the driving field has died away, into the opposite direction along the easy axis. It has been found that the speed of rotational switching is many times greater than that of wall motion switching and correspondingly shorter driving pulses may be used.

Referring now to FIGURE 1 of the drawing, this figure shows, in schematic form, an arrangement of elementary thin film areas 1 and associated conductors 3, 4, 5 and 7 for the transfer of stored binary information items from one element to another. For the sake of simplicity, the substrate supporting the areas 1 is omitted and the conductors 3, 4, 5 and 7 are represented by lines indicating their directions relative to the areas 1 with which they are coupled. It will be appreciated that the conductors 3, 4, 5 and 7 are insulated from each other and from the film areas 1 in the usual way, although again for simplicity's sake, the insulation is not indicated in the drawing.

The elementary film areas 1 have easy and hard axes in the directions indicated by lines 2 and 17 respectively. A stored information item of binary "one" value is represented by the alignment of the magnetisation vector towards the left as shown in FIGURE 1 and an item of binary "zero" value is represented by the alignment of the vector in the opposite direction.

Each pair of adjacent elementary areas 1 is coupled by a link conductor 3. The link conductor 3 is in the form of a closed loop and assuming the direction of information transfer to be from left to right as shown in FIGURE 1, the part of the loop coupled to the left-hand element 1 of the pair passes across that element substantially in alignment with the hard axis while the part of the loop coupled to the right-hand element 1 of the pair passes across that element substantially in alignment with the easy axis.

A drive conductor 4 is coupled to the first element 1 (i.e. the extreme left-hand element in FIGURE 1) and passes across it at an angle to the hard axis. The conductor 4 is then coupled to the second element 1 and passes across it substantially in alignment with the hard axis. Thenceforward the conductor 4 is coupled to succeeding odd-numbered elements 1 in the same manner as it is coupled to the first element 1 and to succeeding even-numbered elements 1 in the same manner as it is coupled to the second element 1.

A second drive conductor 5 is coupled to the second and subsequently to the remaining even-numbered elements 1, passing across these elements at an angle to the hard axis, and is also coupled to the third and subsequent odd-numbered element 1, passing across these elements substantially in alignment with the hard axis.

In order to explain the operation of the arrangement, it will be assumed that initially the first element 1 is storing a binary "one" with the magnetisation vector aligned towards the left. The remaining elements 1 are initially assumed to be in the opposite state. In order to initiate the transfer of the stored item from the first to the second element 1, a short current pulse is applied to the conductor 4 from a source 18. This pulse has a very fast rise time and lasts for only a few nanoseconds. This time is sufficient to allow switching by domain rotation but is insufficient for switching to take place by wall motion. The magnitude of the pulse is great enough to cause the magnetisation vector of the first element 1 to rotate into alignment with the magnetic field created by the current in the plane of the element. This field is perpendicular to the direction of the conductor 4 and the current direction is such that the vector assumes a position indicated by dashed arrow 6. At the end of the current pulse, the vector relaxes into alignment with the easy axis in direction representing binary zero. Thus, the application of the driving pulse to the conductor 4 resets the first element 1. The angle between the conductor 4 and the hard axis of the odd-numbered element 1 is exaggerated in FIGURE 1 for the sake of clarity of illustration. In practice, this angle may be only about 10°.

Switching of the first element 1 to the reset state induces a current in the link conductor 3. This current in turn produces a hard axis magnetic field linking with the second element 1 sufficient to turn the magnetisation vector away from the easy axis. The drive current pulse in the conductor 4 also produces a magnetic field linking with the second element 1 and this field is applied substantially in alignment with the easy axis in the sense required to set the second element 1 into the state representing an information item of binary "one" significance. Thus, under these conditions the resultant field applied to the second element 1 has components along both the easy and hard axes and the second element 1 then switches by domain rotation into the state corresponding to the storage of an item of binary "one" significance. Hence, the item having binary "one" significance has now been transferred from the first to the second element 1.

If the first element had been in the "zero" or reset state, it would not have been switched by the drive current pulse and any current in the link conductor 3 due to disturbance of the magnetisation vector would not have been sufficient to affect appreciably the remanent state of the second element 1. In this case the drive current pulse in the conductor 4 produces a field only along the easy axis linking with the second element 1. As previously noted, an easy axis field of this kind would only produce switching by wall motion and the duration of the driving pulse is insufficient to allow switching of the element 1 in this mode to the opposite state. Hence, the second element is not switched and remains in the zero-representing state.

Thus, it is seen that the application of a driving current pulse to the conductor 4 causes an information item stored in the first element 1 to be transferred to the second element. In the same way, information is transferred from any one of the odd-numbered elements 1 to the next succeeding even-numbered element.

Similarly, the application of a driving current to the conductor 5 from a source 19 produces a transfer of information from an even-numbered element 1 to the next succeeding odd-numbered element. Thus, to transfer information along the succession of elements 1, the driving conductors 4 and 5 are pulsed alternately by the sources 18 and 19, respectively. During the transfer of a binary "one" representation from, say, the second element 1 to the third element, the second element is reset and any resultant current induced into the link conductor 3 between the first and second elements 1 will provide a small field at the first element. However, this field is applied along the easy axis and, since it has no hard axis component, it cannot initiate rotational switching. Hence, for the reason noted above, the first element 1 cannot be switched. The configuration of the link conductors therefore prevents transfer of items in the reverse direction.

Essentially, therefore the arrangement shown in FIGURE 1 forms a shifting register which uses a two-phase driving system for its operation. In order to enter information items of binary "one" significance into the first element 1 of the register, a writing conductor 7 is provided linked with this element. The conductor 7 is arranged parallel to the conductor 4 and, in order to enter an item, a writing current pulse from a source 20 is applied to the conductor 7 in the reverse sense to the drive pulses which are applied to the conductor 4 during the transfer operation. Hence, the writing pulse switches the first element from its reset state to the opposite state. It will be realised that, although the stored information items have been referred to as being of binary "one" significance, the binary representation may be reversed, and that the elements 1 are merely bistable stages which are normally in a reset state and which are switched to the opposite state in order that they may represent a stored information item.

Referring now to FIGURE 2 of the drawing, the thin film areas 1 are supported on a substrate 8 which is preferably of conductive material, for example, aluminium. The drive conductor 4 is formed by applying a copper foil pattern to a layer of insulation (not shown) which is in turn applied over the pattern of elements 1. Alternatively, the entire conductor arrangement may be built up by evaporation of successive layers of insulating and conductive materials through suitable masks in apparatus similar to that used for the initial deposition of the elements 1. It will be appreciated that only one of the link conductors 3 is shown for the sake of clarity, although a further conductor 3 is linked with, for example, the right-hand element as indicated in FIGURE 1. Similarly, only the drive conductor 4 is shown in FIGURE 2, whereas in practice the conductor 5 is also required. The position of the conductor 7 is indicated in FIGURE 2 and it will be apparent that parallel conductors passing across an elementary area are laid over one another so that both couple magnetically with the film area.

It will be appreciated that the two-phase system described above in relation to the shifting register arrangement of FIGURE 1 uses two interleaved transfer-initiating patterns of conductors. In some circumstances a single transfer conductor may with advantage be used to control transfer into or out of a single element.

For example, the arrangement shown schematically in FIGURE 3 of the drawing uses a single driving conductor 9 linked with one film element 10 in a direction at an angle to the hard axis and with a number of other elements 11 all in a direction aligned with the hard axis. A current pulse source 21 is provided to energise the conductor 9. In order to transfer a stored item from the element 10 to the elements 11 a link conductor 12 passes across the element 10 substantially in alignment with the hard axis and crosses each of the elements 11 in turn substantially in alignment with the easy axis. The transfer of a stored item out of the element 10 takes place as previously described with reference to the first element 1 of the configuration shown in FIGURE 1. Since all the elements 11 are affected by similar driving conditions, the item transferred out of the element 10 is entered into all the elements 11.

It will be appreciated that additional conductors may be provided for the initial entry of an information item and also for reading out a stored item from any of the elements into which it has been transferred, by the operating systems described.

FIGURE 4 of the drawing shows schematically an arrangement in which a number of elements 13 are each coupled to a driving conductor 14 in such a manner that the conductor 14 lies at an angle to the hard axis of each of the elements 13. A further element 15 is coupled to the conductor 14 such that the conductor 14 lies parallel to the hard axis of the element 15. A link conductor 16 is coupled to the elements 13 and to the elements 15, the conductor 16 lying substantially parallel to the hard axis across the elements 13 and substantially parallel to the easy axis across the element 15. In this way, using the mode of operation described above, an item of information stored in any of the elements 13 is transferred to the element 15. It will be realised that this configuration corresponds to a logical "OR" arrangement, the element 15 being switched to the set state if at least one of the elements 13 is in the set state prior to the application of a driving current pulse to the conductor 14 from a source 22.

The operation of thin film devices in the manner described is seen to depend upon the application to an element of an easy axis field from a drive conductor and the concurrent application of a hard axis field component derived from a linking loop to enable switching to take place by domain rotation. At the same time the duration of the driving current pulse is sufficiently short so that any appreciable switching by wall movement in the presence of the large driving field cannot take place. It will be seen, therefore, that the hard axis field produced by the linking loop may be very small in relation to the driving field since its only effect is to shift the magnetisation vector from the easy axis in order to promote rotational switching.

In this connection it is to be noted that under some circumstances it is desirable that the hard axis field linked with an element is established before the easy axis field in order to ensure that the element shows no tendency to nucleation, which would prevent the fast rotational switching. It is, therefore, preferred that the conductor 4 be of greater width where it passes over the even-numbered elements 1 than where it passes over the odd-numbered elements. This causes the switching of an odd-numbered element, and hence the generation of the hard axis linking field, before the drive field coupled with the next even-numbered element has reached the critical coercive value along the easy axis. Similarly, it is preferred that the width of the conductor 5 be greater where it passes the odd-numbered element 1 then where it passes over the even-numbered element.

It is known that in a practical thin film device there are usually variations, in the direction of the easy axes of individual elements of the film caused, for example, by pinholes or other irregularities in the film. However, provided that the drive conductor field is substantialiy in alignment with the mean easy axis of the film it is found that the fast switching mode does not occur in any of the elements when a field along the mean axis is applied by itself, and that the hard direction field component is still required to switch the elements in the time available during the driving current pulse.

I claim:

1. Information storage and transfer apparatus, including a pair of first and second information storage bistable elements each comprising an area of anisotropic magnetic thin film with mutually perpendicular easy and hard axes of magnetisation, each area being switchable by domain rotation between a set state in which the magnetisation is aligned in one direction along the easy axis and an unset state in which the magnetisation is aligned in the opposite direction along the easy axis, said set state representing a stored information item of predetermined binary significance, first magnetic field generating means to apply simultaneously a temporary unsetting magnetic field to said first element and a temporary setting magnetic field, aligned substantially in said one direction along the easy axis, to said second element, and linking means linking said first and second elements and effective, when said first element is switched from the set state to the unset state, to apply to said second element a magnetic field which is substantially aligned with the hard axis and which is effective in combination with said temporary setting field to switch said second element to the set state, whereby an information item of said predetermined binary significance is transferred from said first element to said second element.

2. Information storage and transfer apparatus, including first and second information storage bistable elements each comprising an area of anisotropic magnetic thin film with mutually perpendicular easy and hard axes of magnetisation, each area being switchable by domain rotation between a set state in which the magnetisation is aligned in one direction along the easy axis and an unset state in which the magnetisation is aligned in the opposite direction along the easy axis, said set state representing a stored information item of predetermined binary significance; a conductor magnetically coupled to both said elements, said conductor crossing said first element at a small angle to the hard axis and crossing said second element substantially in alignment with said hard axis; means to energise said conductor to apply simultaneously a temporary unsetting magnetic field to said first element and a temporary setting magnetic field, aligned substantially in said one direction along the easy axis, to said second element; and linking means linking said first and second elements and effective, when said first element is switched from the set state to the unset state, to apply to said second element a magnetic field which is substantially aligned with the hard axis and which is effective, in combination with said temporary setting field, to switch said second element to the set state, whereby an information item of said predetermined binary significance is transferred from said first element to said second element.

3. Information storage and transfer apparatus, including first and second information storage bistable elements each comprising an area of anisotropic magnetic thin film with mutually perpendicular easy and hard axes of magnetisation, each area being switchable by domain rotation between a set state in which the magnetisation is aligned in one direction along the easy axis and an unset state in which the magnetisation is aligned in the opposite direction along the easy axis, said set state representing a stored information item of predetermined binary significance; a first conductor magnetically coupled to both said elements, said first conductor crossing said first element at a small angle to the hard axis and crossing said second element substantially in alignment with the hard axis; means to energise said first conductor to aply simultaneously, a temporary unsetting magnetic field to said first element and a temporary setting magnetic field, aligned substantially in said one direction along the easy axis, to said second element; and a second conductor in the form of a closed loop linking said first and second elements and effective, when said first element is switched from the set state to the unset state, to apply to said second element a magnetic field which is substantially aligned with the hard axis and which is effective, in combination with said temporary setting field, to switch said second element to the set state, whereby an information item of said predetermined binary significance is transferred from said first element to said second element.

4. Information storage and transfer apparatus, including first, second, third and fourth information storage bistable elements each comprising an area of anisotropic magnetic thin film with mutually perpendicular easy and hard axes of magnetisation, each area being switchable by domain rotation between a set state in which the magnetisation is aligned in one direction along the easy axis and an unset state in which the magnetisation is aligned in the opposite direction along the easy axis, said set state representing a stored information item of predetermined binary significance; means to enter an item of said predetermined binary significance into said first element; a first conductor magnetically coupled to each of said elements, said first conductor crossing said first and third elements at a small angle to the hard axis and crossing said second and fourth elements substantialy in alignment with the hard axis; first energising means operable to energise said first conductor to apply, simultaneously, a temporary unsetting magnetic field to said first and third elements and a temporary setting magnetic field, substantially aligned in said one direction along the easy axis, to said second and fourth elements; a second conductor magnetically coupled to said second, third and fourth elements, said second conductor crossing said second and fourth elements at a small angle to the hard axis and crossing said third element substantially in alignment with said hard axis; second energising means operable to energise said second conductor to apply, simultaneously, a temporary unsetting magnetic field to said second and fourth elements and a temporary setting magnetic field, substantially aligned in said one direction along the easy axis, to said third element; a first loop conductor linking said first and second elements; a second loop conductor linking said second and third elements; a third loop conductor linking said third and fourth elements, said first, second and third loop conductors being effective, when the first, second and third elements, respectively, are switched from the set state to the unset state, to apply to said second, third and fourth elements, respectively, a magnetic field which is substantially aligned with the hard axis and which is effective, in combination with the applied setting field, to switch said second, third and fourth elements, respectively, to the set state; and means to operate said first and second energising means alternately to cause an information item of said predetermined significance to be transferred through said elements in turn.

5. Information storage and transfer apparatus, including a first and a plurality of second information storage bistable elements each comprising an area of anisotropic magnetic thin film with mutually perpendicular easy and hard axes of magnetisation, each area being switchable by domain rotation between a set state in which the magnetisation is aligned in one direction along the easy axis and an unset state in which the magnetisation is aligned in the opposite direction along the easy axis, said set state representing a stored information item of predetermined binary significance; a first conductor magnetically coupled to said elements, said first conductor crossing said first element at a small angle to the hard axis and crossing each of said second elements substantially in alignment with the hard axis; means to energise said first conductor to apply, simultaneously, a temporary unsetting magnetic field to said first element and a temporary setting magnetic field, aligned substantially in said one direction along the easy axis, to each of said second elements; and a second conductor forming a loop linking all of said elements and effective, when said first element is switched from the set state to the unset state, to apply to each of said second elements a magnetic field which is substantially aligned with the hard axis and which is effective, in combination with said temporary setting field, to switch all of said second elements to the set state to transfer an item of said predetermined binary significance from said first element to said second elements.

6. Information storage and transfer apparatus, including a plurality of first information storage bistable elements and second information storage bistable element, each of said bistable elements comprising an area of anisotropic magnetic thin film with mutually perpendicular easy and hard axes of magnetisation, each area being switchable by domain rotation between a set state in which the magnetisation is aligned in one direction along the easy axis and an unset state in which the magnetisation is aligned in the opposite direction along the easy axis, said set state representing a stored information item of predetermined binary significance; a first conductor magnetically coupled to said elements, said first conductor crossing each of said first elements at a small angle to the hard axis and crossing said second element substantially in alignment with the hard axis; means to energise said first conductor to apply, simultaneously, a temporary unsetting magnetic field to each of said first elements and a temporary setting magnetic field, aligned substantially in said one direction along the easy axis, to said second element; and a second conductor, in the form of a closed loop, which is linked with all of said elements and which is effective, in response to the switching of any of said first elements from the set state to the unset state, to apply to said second element a magnetic field which is substantially aligned with the hard axis and which is effective, in combination with said temporary setting field, to switch said second element to the set state.

References Cited

UNITED STATES PATENTS

| | | | |
|---|---|---|---|
| 3,151,317 | 9/1964 | Franck et al. | 340—174 |
| 3,176,276 | 3/1965 | Smith | 340—174 |
| 3,244,904 | 4/1966 | Oguey | 307—88 |

BERNARD KONICK, *Primary Examiner.*

S. URYNOWICZ, *Assistant Examiner.*